(12) United States Patent
Choi et al.

(10) Patent No.: US 9,633,615 B2
(45) Date of Patent: Apr. 25, 2017

(54) LIQUID CRYSTAL DISPLAY DEVICE

(75) Inventors: Il Man Choi, Gyeongbuk (KR); Myeong Hoon Kwon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1130 days.

(21) Appl. No.: 12/616,188

(22) Filed: Nov. 11, 2009

(65) Prior Publication Data

US 2010/0315400 A1  Dec. 16, 2010

(30) Foreign Application Priority Data

Jun. 15, 2009  (KR) .................. 10-2009-0052834

(51) Int. Cl.
    *G02F 1/1345*    (2006.01)
    *G02F 1/1362*    (2006.01)
    *G09G 3/36*    (2006.01)

(52) U.S. Cl.
CPC ....... *G09G 3/3611* (2013.01); *G02F 1/13452* (2013.01); *G02F 1/136204* (2013.01); *G09G 3/3648* (2013.01); *G09G 2300/0426* (2013.01)

(58) Field of Classification Search
USPC .......................................... 349/149, 151–152
See application file for complete search history.

(56) References Cited

U.S. PATENT DOCUMENTS

| | | | | |
|---|---|---|---|---|
| 6,100,949 | A * | 8/2000 | Kim ................................. | 349/40 |
| 6,580,486 | B1 * | 6/2003 | Sekine .......................... | 349/139 |
| 7,349,055 | B2 * | 3/2008 | Lee et al. ...................... | 349/152 |
| 2003/0038913 | A1 * | 2/2003 | Choo ............................. | 349/149 |
| 2003/0117567 | A1 * | 6/2003 | Jung et al. .................... | 349/149 |
| 2003/0189685 | A1 * | 10/2003 | Choi et al. .................... | 349/149 |
| 2004/0125060 | A1 * | 7/2004 | Park et al. ...................... | 345/87 |
| 2004/0125308 | A1 * | 7/2004 | Park et al. .................... | 349/149 |
| 2004/0145552 | A1 * | 7/2004 | Song et al. ..................... | 345/87 |
| 2005/0156840 | A1 * | 7/2005 | Kim et al. ...................... | 345/87 |
| 2007/0001988 | A1 * | 1/2007 | Byun ............................ | 345/100 |
| 2007/0046316 | A1 * | 3/2007 | Uei et al. ...................... | 324/770 |
| 2007/0090410 | A1 * | 4/2007 | Chen ............................. | 257/223 |
| 2007/0091218 | A1 * | 4/2007 | Huang et al. .................. | 349/40 |
| 2009/0256981 | A1 * | 10/2009 | Yang et al. .................... | 349/40 |

FOREIGN PATENT DOCUMENTS

| | | | | |
|---|---|---|---|---|
| KR | 2003-0051032 | * | 12/2000 | ............... H05F 3/00 |
| KR | 10-2003-0095904 A | | 12/2003 | |
| KR | 10-2005-0070423 | * | 7/2005 | .......... G02F 1/1345 |
| KR | 10-2005-0122606 | * | 12/2005 | .......... G02F 1/1345 |
| KR | 10-2005-0122606 A | | 12/2005 | |
| KR | 10-2006-0000939 | * | 1/2006 | .......... G02F 1/1345 |
| KR | 10-2006-0019791 | * | 3/2006 | ............ G02F 1/133 |
| KR | 10-2007-0002658 | * | 1/2007 | .......... G02F 1/1345 |

OTHER PUBLICATIONS

KIPO: Office Action for Korean Patent Application No. KR 10-2009-0052834—Issued on Apr. 15, 2013.

* cited by examiner

*Primary Examiner* — Edward Glick
*Assistant Examiner* — Anthony G Quash
(74) *Attorney, Agent, or Firm* — Morgan, Lewis & Bockius LLP

(57) ABSTRACT

An LCD device is disclosed.
The liquid crystal display device includes a capacitor formed between the input terminal of an internal driving circuit and a LOG type signal line, which receive the start pulse signal. Therefore, the LCD device can stably drive its internal driving circuit, even though static electricity is generated on the LOG signal line which is used for transferring the start pulse signal of a short enabling time.

8 Claims, 3 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2009-0052834, filed on Jun. 15, 2009, which is hereby incorporated by reference in its entirety.

BACKGROUND

Field of the Disclosure

This disclosure relates to a liquid crystal display (LCD) device, and more particularly to an LCD device adapted to stably apply a start pulse signal to an internal driving circuit regardless of the generation of static electricity on a start pulse signal input line.

Description of the Related Art

In general, the LCD device includes an LCD panel and driving circuits which are configured to drive the LCD panel. The LCD panel is configured to include a thin film transistor array substrate and a color filter substrate opposite to each other, and a liquid crystal layer interposed between the two substrates. The thin film transistor array substrate and the color filter substrate are combined to maintain a fixed cell gap. The liquid crystal layer is formed in the fixed cell gap.

The driving circuits include at least two gate driver integrated-circuit chips, at least two data driver integrated-circuit chips, a timing controller, and a power supply unit. The gate driver integrated-circuits sequentially apply a scan signal to gate lines on the LCD panel. The data driver integrated-circuit chips apply image information to pixels through data lines on the LCD panel, in synchronization with the sequential supply of scan signal from the gate driver integrated-circuit chips. The timing controller controls the gate and data driver integrated-circuit chips. The power supply unit generates a variety of driving voltages necessary to drive the LCD device.

Such driver integrated-circuit chips are generally connected to the LCD panel in a TAP (tape automated bonding) system or a COG (chip-on-glass) system. The TAP system mounts at least one driver integrated-circuit on a flexible thin-film made from a high polymer material and connects the flexible thin-film with the LCD panel. In other words, the TAP system combines at least one driver integrated-circuits chip and a flexible thin-film in a package (i.e., a tape carrier package (TCP)) and connects the package with the LCD panel. As such, the TAP system is often referred to as a TCP (tape carrier package) system. The COG system mounts the driver integrated-circuit chips on the LCD panel, thereby directly connecting the driver integrated-circuit chips with the LCD panel.

More specifically, the TAB system attaches at least one TCP on the exposed edges of the thin film transistor array substrate. This results from the fact that the edges of the thin film transistor array substrate are exposed at the combination with the color filter substrate because its area is larger than that of the color filter substrate.

Also, the COP system can enable control signals and driving voltages from the timing controller and the power supply unit to be applied to the gate and data driver integrated-circuit chips through a plurality of signal lines on the LCD panel. To rectify this, the COG system can transmit the control signal and the driving voltages using the plurality of signal lines formed in a LOG (line-on-glass) type.

Similarly, the TAB system also can employ the LOG type signal lines, in order to eliminate at least one PCB (printed circuit board) and make the LCD device slimmer. The gate driver integrated-circuit chips requiring relatively small signal lines use the LOG type signal lines formed on the LCD panel, thereby eliminating a gate PCB. In this case, the gate driver integrated-circuit chips receive the control signals and the driving voltages from the timing controller and the power supply unit, which are mounted on a data PCB, through the LOG type signal lines formed on the thin film transistor array substrate.

Among the control signals applied from the timing controller to the LOG type signal lines, a start pulse signal for controlling the driving timing of the gate driver integrated-circuit chips has a very short on-time (or a very short enabling time). Such a start pulse signal of this very short enabling time induces a high impulse voltage to be applied to the LOG type signal lines, thereby generating static electricity on the LOG type signal lines.

Static electricity forces the start pulse signal to not be often input to the gate driver integrated-circuit chips with the desired timing. Also, static electricity frequently affects other signals on the LOG type signal lines adjacent to the start pulse signal line of the LOG type. Accordingly, a malfunction of the gate driver integrated-circuit chip is caused.

BRIEF SUMMARY

Accordingly, the present embodiments are directed to an LCD device that substantially obviates one or more of problems due to the limitations and disadvantages of the related art.

An object of the present embodiment is to provide an LCD device that is adapted to minimize the generation of static electricity due to a start pulse signal, using a capacitor which is formed between the input terminal of a driving circuit and a start pulse signal input line of a LOG (line on glass) type on a thin film transistor array substrate.

Another object of the present embodiment is to provide an LCD device that is adapted to stably apply a start pulse signal to a driving circuit regardless of the generation of static electricity on a start pulse signal input line.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal panel configured to a first substrate on which a plurality of gate lines and a plurality of data lines are arranged and a second substrate opposite to the first substrate; at least two gate driver integrated-circuit chips positioned on the first substrate and configured to drive the plurality of gate lines; and at least two data driver integrated-circuit chips configured to drive the plurality of data lines; a printed circuit board attached one edge of the first substrate and configured to include a controller which is configured to control the gate and data driver integrated-circuit chips, and a voltage generator which is configured to generate voltages for driving the gate and data driver integrated-circuit chips; a plurality of LOG type signal lines formed on the first substrate and configured to transfer signals and voltages from the controller and the voltage generator on the printed circuit board to the gate driver integrated-circuit chips; and a stabilization portion electrically connected to any one of the plurality of LOG type signal lines which is used for transfer one of start and reset pulse signals of a short enabling time from the printed circuit board to the gate driver integrated-circuit chips. The stabilization portion derives a stable signal of short enabling time from the signal including static electricity when static electricity is generated on the LOG type signal line for the signal of short enabling time, and applies the stable signal to the gate driver integrated-circuit chips.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
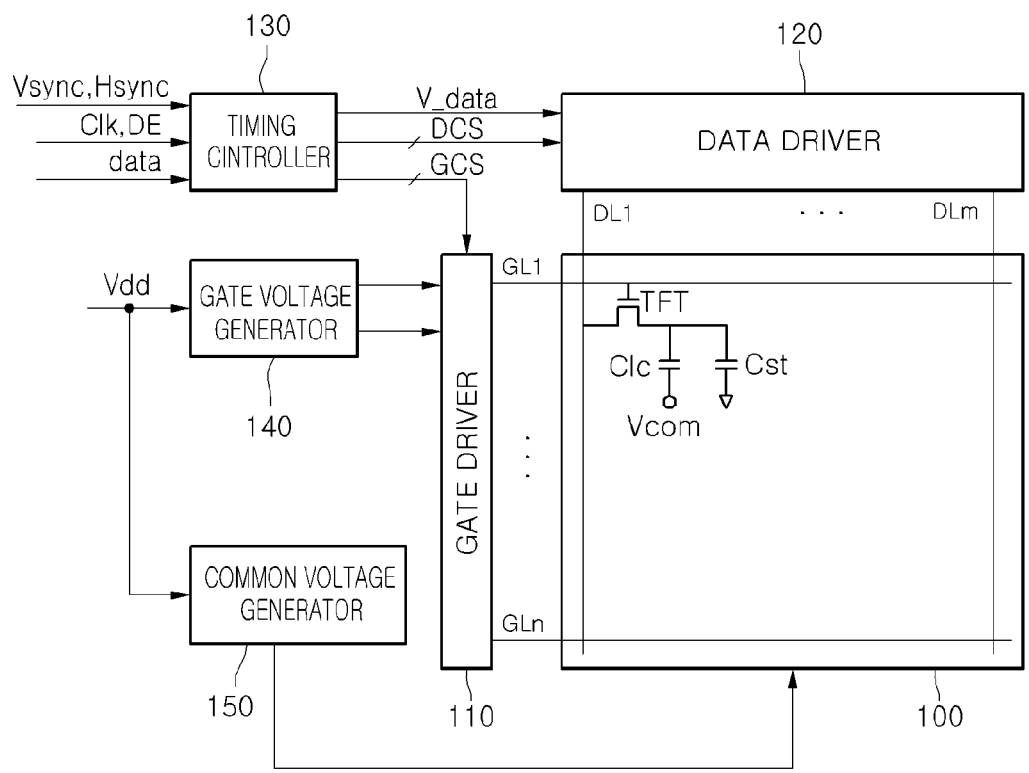
FIG. 1 is a block diagram showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a block diagram showing an LCD device according to an embodiment of the present disclosure. As shown in FIG. 1, an LCD device according to an embodiment of the present disclosure includes an LCD panel 100, a gate driver 110, a data driver 120, a timing controller 130, a gate voltage generator 140, and a common voltage generator 150. The LCD panel 100 is configured to include a plurality of gate lines GL1~GLn and a plurality of data lines DL1~DLm that cross each other, as well as thin film transistors TFT which are formed at the intersections of the plurality of gate lines GL1~GLn and the plurality of data lines DL1 and DLm and drive respective liquid crystal cells Clc. The gate driver 110 is configured to apply a plurality of scan signals to the plurality of gate lines GL1~GLn, respectively. The data driver 120 is configured to apply a plurality of pixel data voltages to the plurality of data lines DL1~DLm, respectively. The timing controller 130 is configured to control the gate and data drivers 110 and 120. The gate voltage generator 140 is configured to apply gate voltages to the gate driver 110. The common voltage generator 150 is configured to apply a common voltage Vcom to a common electrode on the LCD panel 100.

The LCD panel 100 includes a liquid crystal layer formed between two glass substrates. The plurality of gate lines GL1~GLn and the plurality of data lines DL~DLm that cross each other are formed on the lower glass substrate of the two substrates. Each of the thin film transistors TFT formed at the intersections of the plurality of gate lines GL~GLn and the plurality of data lines DL~DLm responds to the scan signal on the respective gate lines GL~GLn and applies the pixel data voltage from the respective data lines DL~DLm to the respective liquid crystal cells Clc. To this end, each of the thin film transistors TFT is configured to include a gate electrode connected to the respective gate line GL, a source electrode connected to the respective data line DL, and a drain electrode connected to a pixel electrode of the respective liquid crystal cell Clc. Moreover, storage capacitors Cst maintaining a voltage charged in the respective liquid crystal cells Clc are formed on the lower glass substrate of the LCD panel 100. Each of the storage capacitors Cst can be formed to be connected between the respective liquid crystal cell Clc and a previous gate line. Alternatively, each of the storage capacitors Cst can be formed to be connected between the respective liquid crystal cell Clc and a common line which is additionally formed on the lower glass substrate.

An upper glass of the two substrates included in the LCD panel 100 is configured to include red, green, and blue color filters R, G, and B, a black matrix, and a common electrode on it. The red, green, and blue color filters R, G, and B are formed opposite to the pixel regions on which the thin film transistors are formed. The black matrix is formed to border on the edges of the color filters and to cover the gate lines GL~GLn, the data lines DL1~DLm, and the thin film transistors TFT. The common electrode covers the color filters and the black matrix.

The gate driver 110 responds to gate control signals GCS from the timing controller 130 and applies a plurality of scan signals to the plurality of gate lines GL~GLn, respectively. The plurality of scan signals allows the plurality of gate lines GL~GLn to be sequentially enabled in a single horizontal signal period. Such a gate driver 110 can be configured to include at least two data driver integrated-circuit chips.

The data driver 120 responds to data control signals DCS from the timing controller 130. Also, the data driver generates a plurality of pixel data voltages to be respectively applied to the plurality of data lines DL~DLm, whenever any one among the plurality of gate lines GL~GLn is enabled. Such a data driver 120 can be configured to include at least two data driver integrated-circuit chips.

The timing controller 130 derives the gate control signals GCS and the data control signals DCS from synchronous signals Vsync and Hsync, a data enable signal DE, and a clock signal Clk which are applied from an external system (for example, the graphic module of a computer, or the image demodulation module of a television). The gate control signals GCS are used for controlling the gate driver 110, and the data control signals DCS are used for controlling the data driver 120. Also, the timing controller 130 rearranges image data Data input from the external system and applies the rearranged data V_data to the data driver 120.

The gate voltage generator 140 receives a supply voltage Vdd from a power supply unit (not shown) and generates the gate voltages (more specifically, a high gate voltage and a low gate voltage) from the received supply voltage Vdd. The gate voltages are applied to the gate driver 110 and are used for driving the gate lines GL~GLn on the LCD panel 100.

Similarly, the common voltage generator 150 receives the supply voltage Vdd from the power supply unit and generates the common voltage Vcom from the received supply voltage Vdd. The common voltage Vcom is applied to the common electrode on the LCD panel 100. The common voltage generator 150 together with the timing controller 130 and the gate voltage generator 140 can be arranged on a data PCB (printed circuit board) loaded with the data driver 120.

Figure 2:
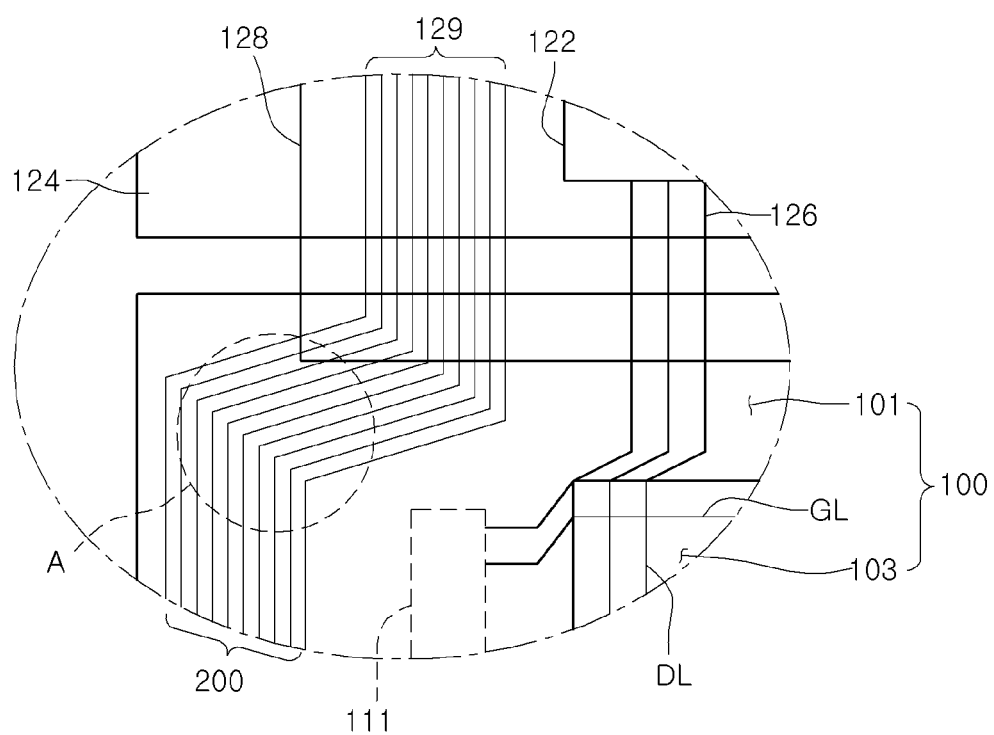
FIG. 2 is a schematic diagram showing a part of the LCD device of FIG. 1.

FIG. 2 is a schematic diagram showing a part of the LCD device of FIG. 1. Referring to FIGS. 1 and 2, The LCD device includes an LCD panel 100 on which a plurality of gate lines GL and a plurality of data lines DL are arranged and a data PCB 124 adjoined to one edge of the LCD panel 100. The data PCB 124 is configured to include at least one data driver integrated-circuit chip 122, a timing controller (130 in FIG. 1), a gate voltage generator (140 in FIG. 1), and a common voltage generator (150 in FIG. 1) which are arranged on it. The data driver integrated-circuit chip 122 drives the data lines DL, The LCD panel 100 includes a thin film transistor array substrate 101 and a color filter substrate 103. The gate lines GL are arranged in fixed intervals along with a vertical direction on the thin film transistor array substrate 101. The data lines DL are arranged in fixed intervals along with a horizontal direction on the thin film transistor array substrate 101. Crossing of the gate lines GL and the data lines DL define pixels which are arranged in a matrix shape on the thin film transistor array substrate 101.

The color filter substrate 103 is configured to include red, green, and blue color filters, a black matrix, and a common electrode which are formed on it. The red, green, and blue color filters are formed at the positions of the color filter substrate 103 opposite to the pixels. The black matrix is formed to surround the edges of the color filters and prevents interference between color lights passing through the color filters. The common electrode together with pixel electrodes on the thin film transistor array substrate 101 applies an electric field to a liquid crystal layer. In other words, liquid crystal molecules of the liquid crystal layer are driven by a voltage difference between the pixel electrode and the common electrode which are positioned on the inner surfaces of the thin film transistor array substrate and the color filter substrate opposite to each other. Moreover, brightness of image displayed on the LCD panel 100 varies along the gray scale of image information applied to the pixels.

The data PCB 124 is electrically and physically connected to the LCD panel 100 by a flexible printed circuit (FPC) 128. At least two data driver integrated-circuit chips 122 forming the data driver 120 of FIG. 1 are mounted on the data PCB 124. A plurality of data lead lines electrically connected to the plurality of data lines DL are formed on the data PCB 124.

The plurality of data lead lines 126 are connected to the output terminals of at least two data driver integrated-circuit chips 122. Also, the plurality of data lead lines 126 are connected to the plurality of data lines DL formed on the LCD panel 100 through a contact portion (not shown) on the FPC 128. Accordingly, pixel data voltages are applied from at least two data driver integrated-circuit chips 122 to the plurality of data lines DL.

Moreover, a plurality of signal lead lines 129 are formed on the data PCB 124 and the FPC 128. The plurality of signal lead lines 129 receive control signals and clock signals from the timing controller (130 in FIG. 1) on the data PCB 124. The plurality of signal lead lines 129 further receive gate voltages from the gate voltage generator (140 in FIG. 1) on the data PCB 124 and a supply voltage and a ground voltage from a power supply unit (not shown). Furthermore, the plurality of signal lead lines 129 apply the control signals, the clock signal, the gate voltages, the supply voltage, and the ground voltage to at least two gate driver integrated-circuit chips 111 formed on the thin film transistor array substrate 101 of the LCD panel 100 via a plurality of LOG type signal lines 200 on the thin film transistor array substrate 101.

At least two gate driver integrated-circuit chips on the thin film transistor array substrate 101 configure a gate driver (110 in FIG. 1). The gate driver including at least two gate driver integrated-circuit chips 111 generates scan signals using the control signal, the clock signals, the gate voltages, the supply voltage, and the ground voltage which are applied from the plurality of LOG type signal lines 200. The scan signals are applied to the gate lines GL1~GLn on the LCD panel 100.

Figure 3:
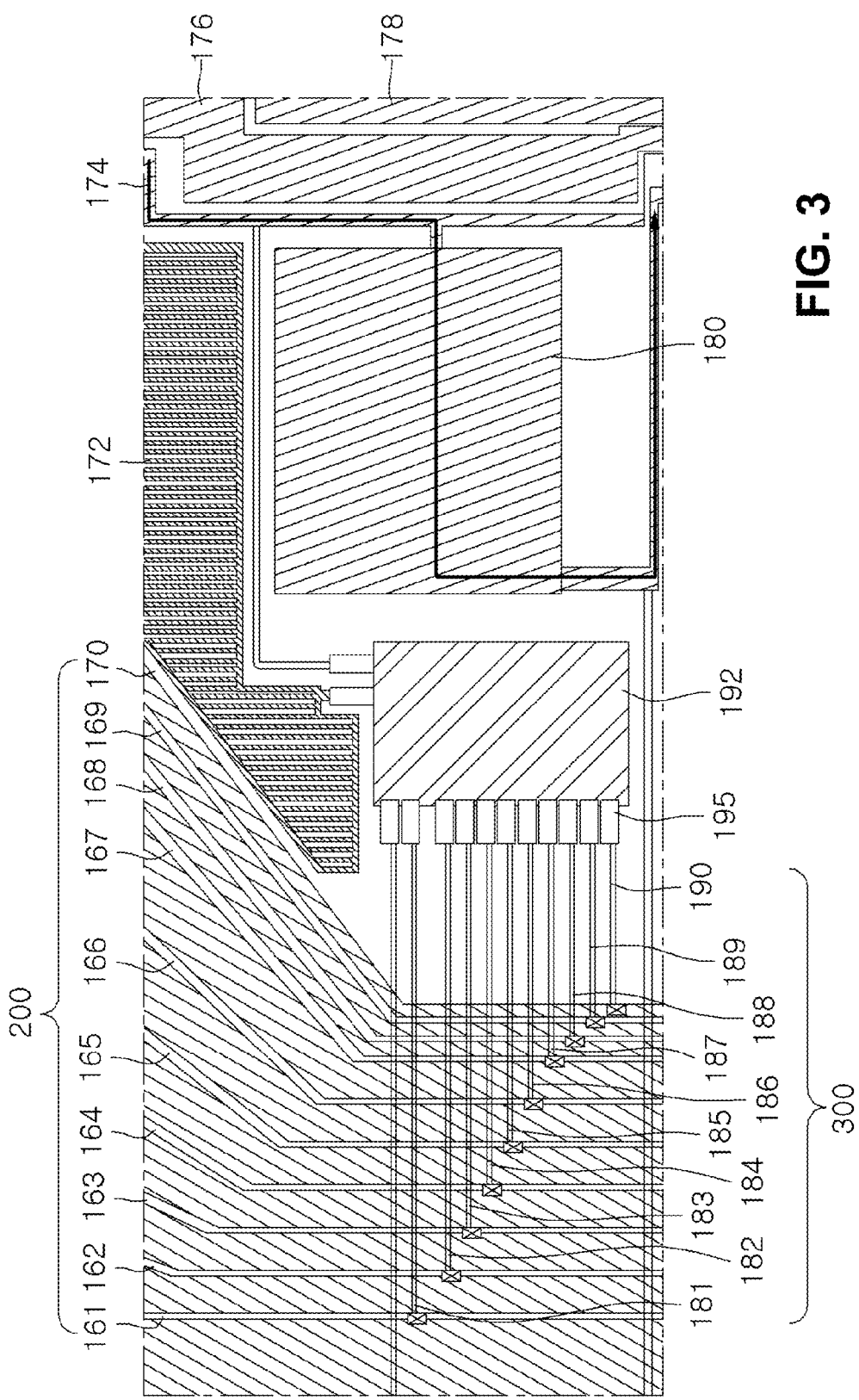
FIG. 3 is a detailed diagram showing a portion A of FIG. 2.

FIG. 3 is a detailed diagram showing a portion A of FIG. 2. As shown in FIGS. 2 and 3, the thin film transistor array substrate 101 is configured to include a plurality of LOG type signal lines 200, a plurality of link lines 300, a floating metal pattern 192, a dummy pattern 172, and a stabilization portion 180 which are formed on it. The plurality of link lines 300 are electrically connected to the plurality of LOG type signal lines 200 by means of contacts. The floating metal pattern 192 is electrically connected to the plurality of link lines 300.

Also, the thin film transistor array substrate 101 can include a common voltage line 176 and a common voltage feedback line 178 which are formed on it. The common voltage line receives a common voltage Vcom from a common voltage generator (150 in FIG. 1) on the data PCB 124. The common voltage feedback line 178 is used for feeding back the common voltage Vcom applied to the LCD panel 100.

Among the plurality of LOG type signal lines 200, a first LOG type signal line 161 receives a ground voltage GND, a second LOG type signal line 162 receives a reset signal Reset, and a third LOG type signal line 163 receives a first supply voltage Vss. Fourth to seventh LOG type signal lines 164-167 receive first to fourth clock signals including gate control signals, respectively, and a eighth LOG type signal line 168 receives a second supply voltage Vdd. A ninth LOG type signal line 168 receives an odd-numbered supply voltage Vdd-o, and a tenth LOG type signal line 170 receives an even-numbered supply voltage Vdd-e. An eleventh LOG type signal line is formed on the thin film transistor array substrate 101 in such a manner to be separated from the first to tenth LOG type signal lines 161~170 by a fixed interval.

In other words, the plurality of LOG type signal lines 200 receive every signal necessary to drive the gate driver integrated-circuit chip 111. Also, although LOG type signal lines 200 is explained to include 11 LOG type signal lines, the number of LOG type signal lines can increase or decrease according to the specifications of the LCD devices.

The plurality of link lines 300 (i.e., first to tenth link lines 181~190) are connected to the first to tenth LOG type signal lines 161~170 among the plurality of LOG type signal lines 200, respectively. The plurality of link lines 300 transfer the signals and voltages on the first to tenth LOG signal lines 161~170 to the floating metal pattern 192.

The thin film transistor array substrate 101 further includes static electricity preventing circuits 195 formed between the plurality of link lines 300 and the input terminals of the floating metal pattern 192 which receive the signals and voltages from the plurality of link lines 300. These static electricity preventing circuits 195 enable static electricity not to be generated (or included) in the signals and voltages which are applied from the plurality of link lines 300 (i.e., the first to tenth link lines 181~190) to the floating metal pattern 192.

The floating metal pattern 192 applies the signals and the voltages input through the plurality of link lines 300 (i.e., the first to tenth link lines 181~190) and the static electricity preventing circuits 195 to the input terminals of at least two gate driver integrated-circuit chips 111. In other words, the floating metal pattern has a function of stably transferring the signals and the voltages to the input terminals of at least two gate driver integrated-circuit chips 111.

The eleventh LOG type signal line 174 among the plurality of LOG type signal lines 200 is separated from the first to tenth LOG type signal lines 161~170. The eleventh LOG type signal line 174 receives a start pulse signal from the timing controller (130 in FIG. 1) on the data PCB (124 in FIG. 2). Also, the eleventh LOG type signal line 174 is electrically connected to the floating metal pattern 192 via the static electricity preventing circuit 195, as well as is electrically connected to the stabilization portion 180. As such, the eleventh LOG type signal line 174 applies the start pulse signal to the floating metal pattern 192 and the stabilization portion 180. The stabilization portion 180 can be configured to include a metal capacitor.

The start pulse signal has a high level pulse of very short enabling time in comparison with other signals such as the gate control signals or the first to fourth clock signals. As such, static electricity can be generated while the start pulse signal is transferring on the eleventh LOG type signal line 174. Accordingly, the start pulse signal in which static electricity is generated can be applied to the stabilization portion 180. Also, a reset pulse signals has a high level pulse of very short enabling time in comparison with other signals.

The stabilization portion 180 has an area larger than the eleventh LOG type signal line 174. As such, the stabilization portion 180 can stably output the start pulse signal, even though the start pulse signal including static electricity is input. The start pulse signal stably output from the stabilization portion 180 is applied to the gate driver integrated-circuit chip (111 in FIG. 2). Therefore, the gate driver integrated-circuit chips (111 in FIG. 2) are normally driven by the stable start pulse signal and applies scan signals with the desired timing to the gate lines GL on the LCD panel (100 in FIG. 2). Furthermore, the stabilization portion can effectively eliminate static electricity generated in processes of depositing a metal film on the thin film transistor array substrate, etching the deposited metal film on the thin film transistor array substrate, rubbing an alignment film on the thin film transistor array substrate, and others Consequently, the stabilization portion 180 can stably output the start pulse signal, even though static electricity is generated while the start pulse signal is transferring on the eleventh LOG type signal line 174. Accordingly, the generation of static electricity in the start pulse signal can be minimized.

As described above, the LCD device according to an embodiment of the present disclosure includes the metal capacitor formed between the input terminal of an internal driving circuit and the LOG type signal line, which receive the start pulse signal, among the plurality of LOG type signal lines on a thin film transistor array substrate. Therefore, the LCD device can minimize the generation of static electricity on the LOG type signal line which is used for transferring the start pulse signal of a very short enabling time. Moreover, the LCD device can stably drive its internal driving circuit, even though static electricity is generated.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device, comprising:
a liquid crystal panel comprising:
    a first substrate on which a plurality of gate lines and a plurality of data lines are arranged; and
    a second substrate opposite to the first substrate;
at least two gate driver integrated-circuit chips positioned on the first substrate and connected to the plurality of gate lines; and
at least two data driver integrated-circuit chips connected to the plurality of data lines;
a printed circuit board attached to one edge of the first substrate and comprising:
    a controller configured to control the gate and data driver integrated-circuit chips; and
    a voltage generator configured to generate voltages for driving the gate and data driver integrated-circuit chips;
a plurality of line-on-glass signal lines formed on a non-displaying area of the first substrate, the plurality of line-on-glass signal lines being configured to transfer signals and voltages from the controller and the voltage generator on the printed circuit board to the gate driver integrated-circuit chips;
a plurality of link lines formed opposite to the plurality of line-on-glass signal lines;
a stabilization portion electrically connected to any one of the plurality of line-on-glass signal lines;
a metal pattern electrically connected to the gate driver integrated-circuit chips; and
static electricity preventing circuits positioned between the plurality of link lines and the metal pattern,
wherein the stabilization portion consists of a metal capacitor,
wherein one of the plurality of line-on-glass signal lines that is provided with a start pulse signal is connected to the gate driver integrated-circuit chip through the stabilization portion, and
wherein the one of the plurality of line-on-glass signal lines is connected to the gate driver integrated-circuit chip through both of:
    the metal pattern, and
    one of the static electricity preventing circuits.

2. The liquid crystal display device of claim 1, wherein the signals of a short enabling time include the start pulse signal and a reset pulse signal.

3. The liquid crystal display device of claim 1, wherein the metal capacitor comprises an area larger than the one of the plurality of line-on-glass signal lines.

4. The liquid crystal display device of claim 1, wherein the plurality of link lines are configured to allow the signals and the voltages on the plurality of line-on-glass signal lines to be applied to the gate driver integrated-circuit chips.

5. The liquid crystal display device of claim 4, wherein the metal pattern is electrically connected to the plurality of link lines, the metal pattern being configured to allow the signals and the voltage on the plurality of link lines to be stably applied to the gate driver integrated-circuit chips.

6. The liquid crystal display device of claim 5, wherein the static electricity preventing circuits are positioned between the plurality of link lines and the metal pattern, the static electricity preventing circuits configured to prevent the signals and the voltages from experiencing static electricity.

7. The liquid crystal display device of claim 1, wherein the one of the plurality of line-on-glass signal lines is electrically connected to the metal pattern.

8. The liquid crystal display device of claim 1, wherein an enabling-time of the start pulse signal is shorter than an enabling-time of signals provided to the other line-on-glass signal lines.

* * * * *